(12) United States Patent
Sheynblat

(10) Patent No.: US 8,731,821 B2
(45) Date of Patent: May 20, 2014

(54) METHOD AND APPARATUS FOR DETERMINING RELEVANT POINT OF INTEREST INFORMATION BASED UPON ROUTE OF USER

(75) Inventor: Len Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1227 days.

(21) Appl. No.: 11/686,890

(22) Filed: Mar. 15, 2007

(65) Prior Publication Data

US 2007/0219706 A1 Sep. 20, 2007

Related U.S. Application Data

(60) Provisional application No. 60/782,774, filed on Mar. 15, 2006, provisional application No. 60/784,607, filed on Mar. 20, 2006.

(51) Int. Cl.
G01C 21/00 (2006.01)

(52) U.S. Cl.
USPC ........... 701/426; 701/400; 701/420; 701/421; 701/425; 701/438

(58) Field of Classification Search
USPC .............. 701/208, 210, 400–485; 340/995.24
See application file for complete search history.

(56) References Cited

U.S. PATENT DOCUMENTS

| | | | |
|---|---|---|---|
| 5,802,492 A * | 9/1998 | DeLorme et al. | 455/456.5 |
| 5,850,618 A | 12/1998 | Suetsugu et al. | |
| 5,948,040 A * | 9/1999 | DeLorme et al. | 701/426 |
| 6,127,945 A * | 10/2000 | Mura-Smith | 340/988 |
| 6,401,034 B1 | 6/2002 | Kaplan et al. | |
| 6,542,814 B2 * | 4/2003 | Polidi et al. | 701/454 |
| 6,546,337 B2 * | 4/2003 | Fish et al. | 701/454 |
| 6,553,308 B1 * | 4/2003 | Uhlmann et al. | 701/455 |
| 6,944,539 B2 * | 9/2005 | Yamada et al. | 701/211 |
| 7,035,731 B2 * | 4/2006 | Smith | 701/207 |
| 7,082,365 B2 * | 7/2006 | Sheha et al. | 701/426 |
| 7,161,502 B2 * | 1/2007 | Yamada et al. | 340/995.1 |
| 7,552,009 B2 * | 6/2009 | Nelson | 701/208 |
| 7,826,965 B2 * | 11/2010 | Sadri et al. | 701/438 |
| 2002/0128772 A1 * | 9/2002 | Polidi et al. | 701/208 |
| 2002/0138196 A1 * | 9/2002 | Polidi et al. | 701/208 |

(Continued)

FOREIGN PATENT DOCUMENTS

| | | |
|---|---|---|
| CN | 1605016 A | 4/2005 |
| DE | 4139581 A1 | 6/1993 |

(Continued)

OTHER PUBLICATIONS

International Search Report—PCT/US07/064109, International Search Authority—European Patent Office—Jul. 16, 2007.

(Continued)

Primary Examiner — Bhavesh V Amin
(74) Attorney, Agent, or Firm — Linda G. Gunderson

(57) ABSTRACT

Methods, apparatus, and systems for determining the relevance of points of interest for a user are described. An application server receives information about a user's location, and velocity, as well as other user preferences, and adjusts a search space and filters points of interest identifying those that are relevant to the user. The relevance of the points of interest are based on the user's route, location and velocity.

29 Claims, 11 Drawing Sheets

(56) References Cited

U.S. PATENT DOCUMENTS

| | | | |
|---|---|---|---|
| 2002/0169541 A1* | 11/2002 | Bouve et al. | 701/200 |
| 2003/0036829 A1 | 2/2003 | Shioda | |
| 2003/0036848 A1* | 2/2003 | Sheha et al. | 701/209 |
| 2003/0158660 A1* | 8/2003 | Krull et al. | 701/209 |
| 2003/0191578 A1* | 10/2003 | Paulauskas et al. | 701/200 |
| 2003/0191583 A1* | 10/2003 | Uhlmann et al. | 701/208 |
| 2004/0107044 A1* | 6/2004 | Hasegawa et al. | 701/200 |
| 2004/0204821 A1* | 10/2004 | Tu | 701/200 |
| 2004/0236498 A1* | 11/2004 | Le et al. | 701/200 |
| 2004/0260461 A1 | 12/2004 | Sato et al. | |
| 2005/0187707 A1* | 8/2005 | Yokota et al. | 701/209 |
| 2005/0278114 A1* | 12/2005 | Ahmad | 701/211 |
| 2006/0080032 A1* | 4/2006 | Cooper et al. | 701/208 |
| 2006/0106534 A1* | 5/2006 | Kawamata et al. | 701/208 |
| 2006/0200309 A1* | 9/2006 | Yu et al. | 701/208 |
| 2006/0212217 A1* | 9/2006 | Sheha et al. | 701/209 |
| 2006/0271281 A1* | 11/2006 | Ahn et al. | 701/208 |
| 2007/0038950 A1* | 2/2007 | Taniguchi et al. | 715/768 |
| 2007/0050128 A1* | 3/2007 | Lee et al. | 701/200 |
| 2007/0118278 A1* | 5/2007 | Finn et al. | 701/208 |
| 2007/0179711 A1* | 8/2007 | Tobiyama et al. | 701/211 |
| 2008/0070559 A1* | 3/2008 | Behr et al. | 455/414.2 |
| 2009/0119008 A1* | 5/2009 | Kobuya et al. | 701/208 |

FOREIGN PATENT DOCUMENTS

| | | |
|---|---|---|
| EP | 0720003 | 7/1996 |
| EP | 1128163 A2 | 8/2001 |
| EP | 1441196 | 7/2004 |
| JP | 8184455 A | 7/1996 |
| JP | 9061185 A | 3/1997 |
| JP | 2000187667 A | 7/2000 |
| JP | 2000258173 A | 9/2000 |
| JP | 2000258177 A | 9/2000 |
| JP | 2002092193 A | 3/2002 |
| JP | 2002163267 A | 6/2002 |
| JP | 2003185451 A | 7/2003 |
| JP | 2003302240 A | 10/2003 |
| JP | 2004004029 A | 1/2004 |
| JP | 2004037125 | 2/2004 |
| JP | 2004094444 A | 3/2004 |
| JP | 2004170233 A | 6/2004 |
| JP | 2004226090 A | 8/2004 |
| JP | 2004226199 A | 8/2004 |
| JP | 2006119132 A | 5/2006 |
| WO | 03003877 A1 | 1/2003 |
| WO | WO03038377 | 5/2003 |

OTHER PUBLICATIONS

European Search Report—EP10005586, Search Authority—The Hague Patent Office, Jul. 9, 2010.

Written Opinion—PCT/US2007/064109, International Search Authority, European Patent Office, Jul. 16, 2007.

* cited by examiner

METHOD AND APPARATUS FOR DETERMINING RELEVANT POINT OF INTEREST INFORMATION BASED UPON ROUTE OF USER

RELATED APPLICATIONS

This application claims the benefit of U.S. provisional patent applications Ser. No. 60/782,774, filed Mar. 15, 2006, and Ser. No. 60/784,607, filed Mar. 20, 2006, both entitled "Location- and Velocity-Sensitive Point of Interest Search Engine" which are hereby incorporated by reference in their entirety.

BACKGROUND

1. Field of the Invention

The present invention relates to wireless communication systems, and more specifically, to techniques for providing relevant point of interest information to a user of the wireless communication system based on the user's route and velocity.

2. Background

Services based upon a mobile user's location (Location Based Services, or LBS's) are gaining in popularity. One such service uses the location of the user as a basis to identify points of interest within an area about the user. Another service provides a user with a route from their current location to a desired destination.

Several technologies have been developed to aid in determining the location of a mobile user. One such technique involves using the satellite positioning systems (SPS's) such as Global Positioning System (GPS), Galileo, or Glonass, while other location technologies are based (at least partly) upon network-based solutions. In still another example, the user can manually enter their location. Furthermore, recently many cellular telephones and personal digital assistants have been developed that include telecommunications capability to aid in position determination.

In one service, the user location is used as a starting point and the user enters a desired destination. The service will then calculate a route from the user's present location to the destination and provide that to the user. In another example, a user provides their location and a point of interest (POI) that they desire to find; for example the user may desire to find the nearest restaurant. The service will then use the starting point and search for restaurants within a vicinity of the user and provide this information back to the user.

While these services are useful, there is a need for to improve the relevance of information about points of interest provided to a mobile user.

SUMMARY

Methods, apparatus, and systems for determining relevant points of interest for a user are described. The relevance of a point of interest is a measure of the fitness or appropriateness of a point of interest to the user in their current situation. For example, the relevance of a point of interest can be based on many factors, such as the distance the point of interest is off the route of the user, the length of time it is estimated that it will take to reach the point of interest, the ease or difficulty in reaching the point of interest from the user's route, proximity to public transportation, route for a pedestrian user, and/or the user's velocity. These, and other, factors can be used to identify and rank points of interest according to their appropriateness to the user. In one embodiment, the velocity, and/or speed and direction, of the user can be used by an application server to filter the points of interest (POI). For example, when a user requesting POI data is moving at highway speed, the application can adjust a search space to take into account the speed and the direction of the movement. For example, if a user is traveling at 65 mph (or 30 m/s), the search space can be set to cover an area taking into account the velocity, the time it takes a user to read information about the POI, and the number of objects to be displayed. In addition, because the user is in the moving vehicle, more distance can be traveled so a larger area should be searched in a direction ahead of the user along the route the user is traveling, for example an area up to about five square miles or more can be searched.

Likewise, the search space for a user that is walking along a city street will have a search space that includes a region that is nearer to the user, and may also include a region that is behind, or in a direction that is opposite the direct that the user is walking.

In one embodiment, the POI data can be prioritized based on the direction and ease of access of the POIs by the user. For example, if a user is driving along a road, it may be desirable to prioritize POIs based on the ease of access to the POI from the road being traveled on. On the other hand, for lower speeds, such as a pedestrian walking or even a stationary user, a much smaller search space can be used. For example, a search can be used that filters POI data based on what may be visible to the user. In other words, POIs which are on a street a block away may be near the user but they may not be visible. Likewise, the size of a search space can be set to get the information about POIs that are in close proximity to the user.

In addition, other user information can be used to prioritize the search for POI. In one embodiment, a user can provide information about preferences for particular points of interest, or categories of points of interest, that can be used to prioritize a search for POI. For example, a user can provide information that they would like to visit a particular point of interest, or category of points of interest if they are within an acceptable deviation in distance, or time of travel, from the user's route. The application can also assist the user, for example, by providing a telephone number, or placing a call, to a point of interest. For example, the application can place a call to a restaurant or coffee shop the user wants to visit so that an order can be placed.

In another embodiment, information about the user's schedule, such as from a personal or business calendar can be used to prioritize points of interest. For example, a user's calendar can include a scheduled meeting location and time. The user can provide this calendar information, either manually or automatically, to the application that calculates a route and estimated time of arrival of the user at the meeting place. In one embodiment, as the user travels their route they can request information about a desired point of interest that they would like to visit on the way to the meeting. The application can use the scheduled meeting time to identify which points of interest the user could visit and still make their scheduled meeting. Likewise, if the user is delayed, such as due to traffic conditions, the server can calculate a new estimated time of arrival at the meeting place. The application can also provide options, such as phoning ahead to a point of interest, for example to place an order, or notifying the other meeting attendees that the user is behind schedule and what their estimated time of arrival is.

Other features and advantages of the present invention will become more readily apparent to those of ordinary skill in the art after reviewing the following detailed description and accompanying drawings.

DETAILED DESCRIPTION

Figure 1:
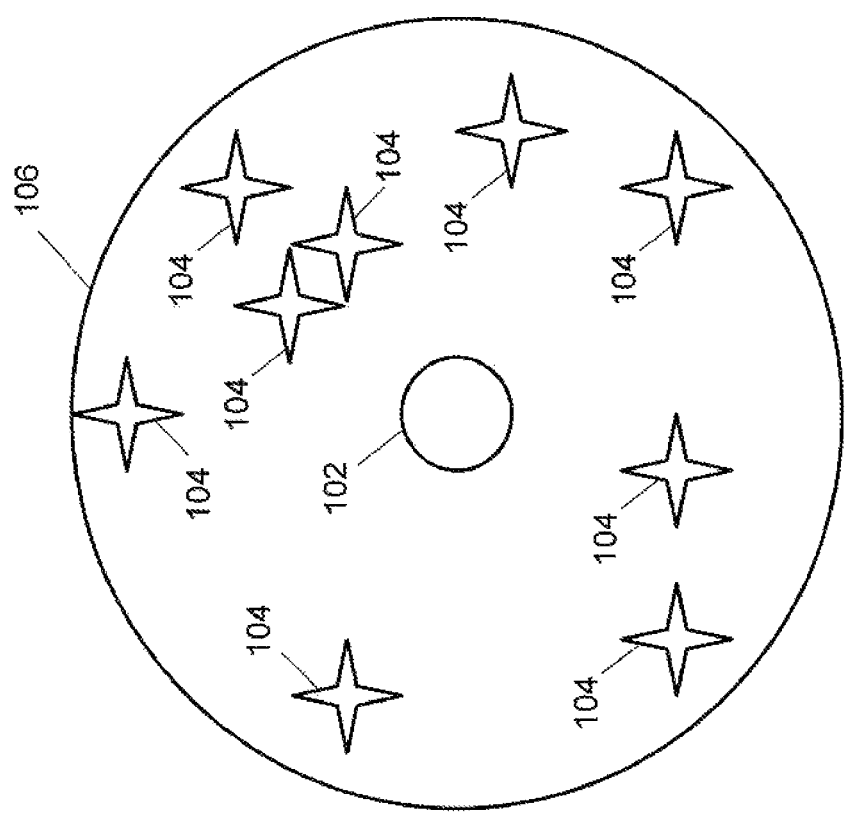
FIG. 1 is a diagram illustrating a conventional system used for locating points of interest in the vicinity of a user.

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Various embodiments of the methods, apparatus, techniques, programs, and system described herein provide for identifying points of interest and ranking them on their relative relevance to a user.

In a convention system, a search for points of interest is performed by a search engine that produces results which are filtered based on the location of the requester. Typically, the location of a user can be provided by various means. Typically, location entry involves manually inputting an address, cross streets, zip code, city, state, country, etc. The area searched for points of interest varies with the location entered.

A location capability can also be implemented on a mobile device. In a mobile device, in addition to manual entry of location information, an automatic location/address determination can be performed if a positioning feature or service is available to the device. For example, if the mobile device is equipped with location determining capability, such as an SPS (satellite positioning system) receiver, then information about the location of the mobile device can be automatically determined.

Accuracy of the location information typically depends on the particular type of the technology used and the specific conditions associated with position determination. Table 1 below list several types of location technologies and their relative performance levels.

TABLE 1

| Measurement Type | Description |
|---|---|
| Global Positioning System (GPS) | Solution based solely on GPS. Highest accuracy with clear view of sky. May not be useful in certain environments (e.g., indoors). |
| GPS and Advanced Forward Link Trilateration (A-FLT) | Hybrid solution based on a combination of GPS and cellular communication system. Intermediate accuracy. Improved indoors availability. |
| A-FLT | Solution based solely on the cellular communication system. Reduced accuracy. Commonly available in urban areas and may be available where GPS is not available (e.g., indoors). |
| Enhanced Cellular Identification (CELL-ID) | Solution based solely on the cellular communication system. Low accuracy (generally depends on the cell sector size and accuracy of round trip delay or similar measurement; may include other cellular measurements such as signal strength). |
| CELL-ID | Solution based solely on the cellular communication system. Lowest accuracy (provides only the identity of the cell where the terminal is located; therefore, accuracy is dependent on the size of the cell). |

Conventional search engines provide information about points of interest in the vicinity of a user but the points of interest are not ranked as to their relevance to the user. When a user is presented with a number of choices (especially a large number), it may be difficult for the user to make a good choice. What is needed is a capability to filter, rank, and present the information that is relevant to the user. The relevance of a particular point of interest can be quite different depending on different scenarios, such as if a user is stationary, walking, or driving.

FIG. 1 is a diagram illustrating a conventional system used for locating points of interest in the vicinity of a user. As shown in FIG. 1, a user's location 102 is determined. The starting position will have an uncertainty based on the accuracy of the position fix and can be represented by a radius of uncertainty, such as a circle. The user can request information about points of interest 104 within a desired distance or vicinity 106 of the user. For example, the user can request the location of restaurants within a desired distance from the user. The service can then search through a database to locate restaurants within the desired vicinity and provide that information back to the user.

Figure 2:
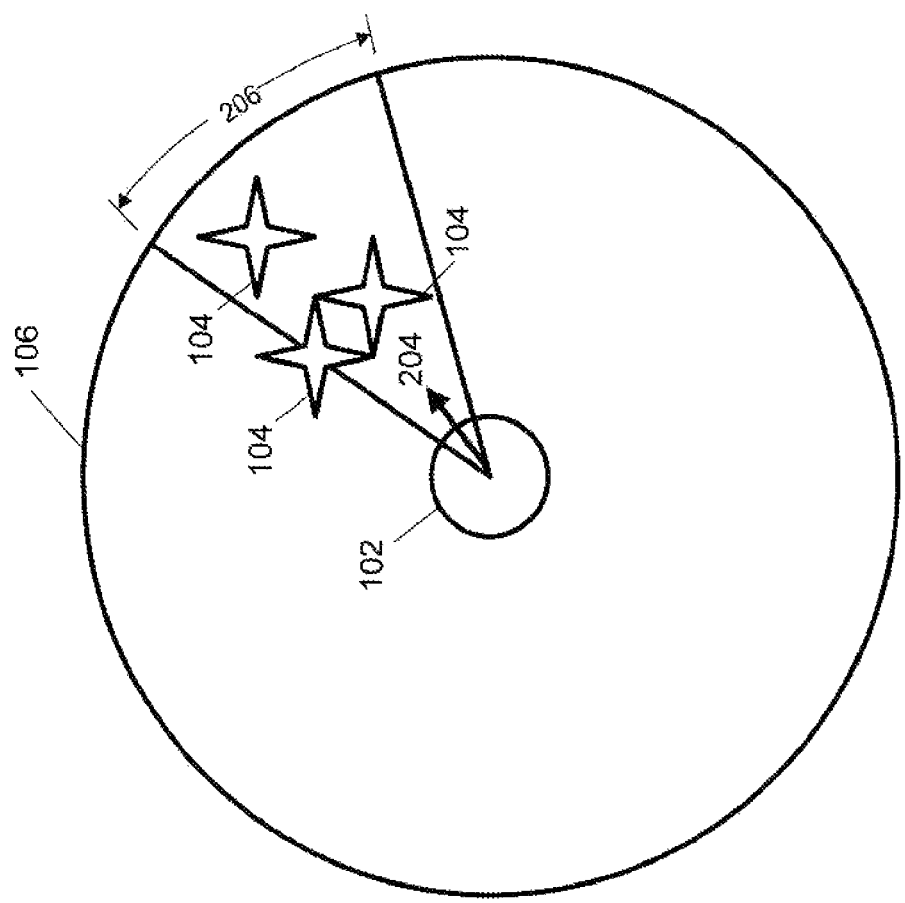
FIG. 2 is a diagram illustrating an enhancement to the conventional system illustrated in FIG. 1.

Another conventional system combines the location, or starting position, of a user along with a desired direction from the user to reduce the search space to a sector with an origin at the starting location. FIG. 2 is a diagram illustrating an enhancement to the conventional system illustrated in FIG. 1. As shown in FIG. 2, the location of the user 102 is determined along with a direction of interest 204. The system can then determine which points of interest 104 are located within a sector 206 in the direction of interest 204 of the user.

It would be desirable to simplify the use of search engines, automate the search process, and use additional information to improve the relevance of the data presented to the user. For example, it would be desirable to simplify the use of a mobile handset-implemented search engine, automate the search process, and use additional information to improve the relevance of the data discovered (mined) and presented. In one embodiment, the velocity, or speed and direction, of the user can be used to filter the points of interest (POI). In other words, when a user requesting POI data is moving at a highway speed, the search space may take into account the speed and the direction of the movement. For example, if a user is traveling at 65 mph (or 30 m/s), the search space can be set to cover an area taking into account the velocity, the time it takes a user to read information about the POI, and the number of objects to be displayed. In addition, because the user is in the moving vehicle, more distance can be traveled so a larger area should be searched in a direction ahead of the user along the route the user is traveling, for example an area up to about five square miles or more can be searched.

The POI data can be ranked, or prioritized, in terms of the presentation, for example, based on the direction and ease of access of the POIs. For example, if a user is traveling along a road, it may be desirable to prioritize POIs based on ease of access from the road being traveled on.

On the other hand, for lower speeds, such as a pedestrian walking or even a stationary user, a much smaller search space can be used. For example, a search can be used that filters POI data based on what may be visible to the user. In other words, the POIs which are on the street a block away may not be visible. Likewise, the size of a search space can be set to get the information about POIs that are in close proximity to the user.

In another example, an estimate of the travel time to the POI can be used to filter or rank the POI. In this case, travel times to multiple POIs can be estimated via routing algorithms which can also take into consideration real-time traffic information for better time-of-travel estimation. In such a case, time of travel may depend on the user scenario, for example, whether the user is walking, driving, riding on public transportation, etc.

Figure 3:
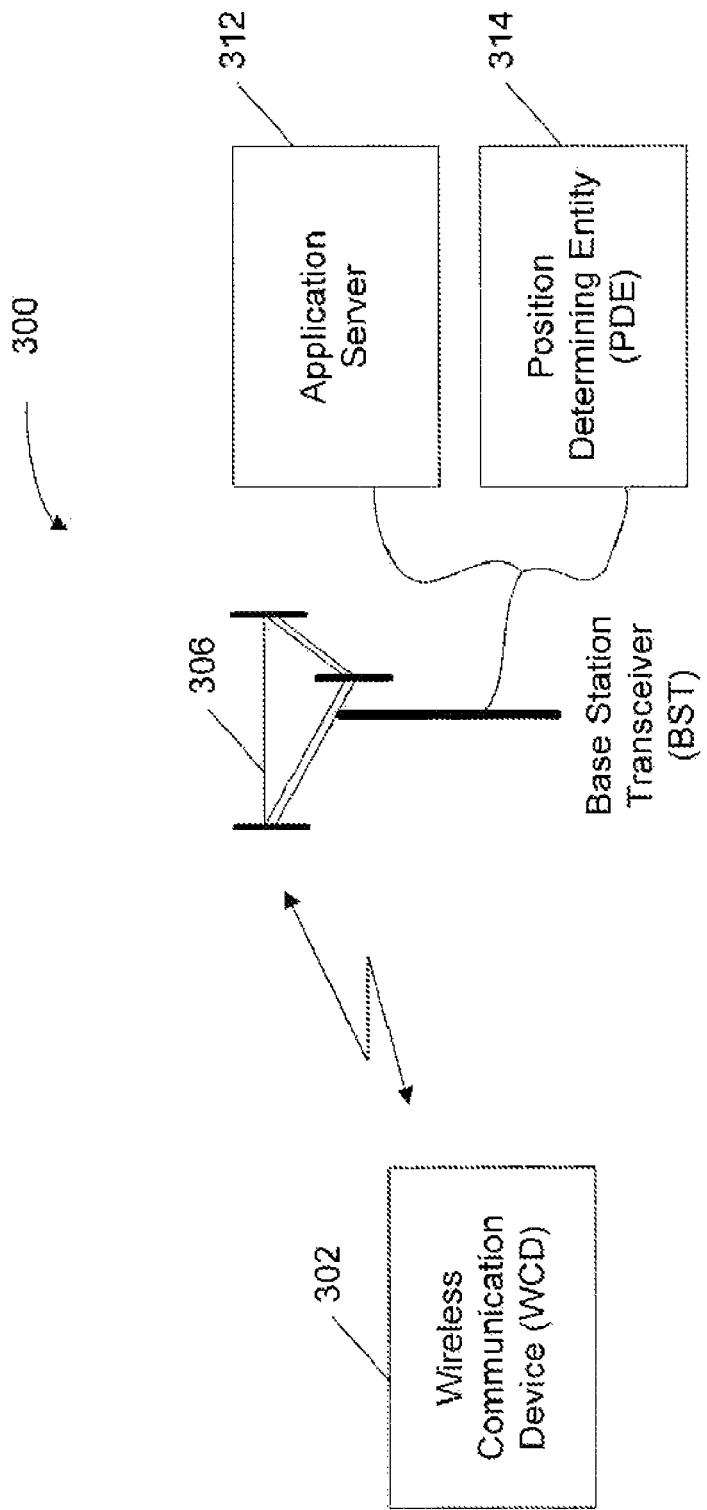
FIG. 3 is a block diagram illustrating a wireless communication system in accordance with an embodiment of the invention.

FIG. 3 is a block diagram illustrating a wireless communication system in accordance with an embodiment of the invention. As shown in FIG. 3, the wireless communication system 300 includes a wireless communication device (WCD) 302, a base station transceiver (BST) 306, and an application server 312. The wireless communication system 300 can also include a position determination entity (PDE) 314 that can assist in determining the location a WCD 302.

In one embodiment, a user carries the wireless communication device 302 with them as they move about within the coverage area of the wireless communication system 300. The user can transmit their location and velocity along with a desired destination to the application server 312. In one embodiment, the user transmits information about their location and velocity and the PDE 314 determines the user's location and velocity and provides that information to the application server 312. The application server 312 can then calculate a desired route for the user of the wireless communication device 302 to reach their desired destination.

Based on the routing information received from the application server 312, the user of the wireless communication device 302 can follow the route towards the destination. While transiting along the route, the user may desire to find a point of interest. For example, the user may desire to find the nearest coffee shop as they transit their route. The user can communicate the desired point of interest to the application server 312. In one embodiment, the application server identifies the points of interest that are along the route of the user.

In another embodiment, the user can select and communicate information about what is an acceptable deviation from their current route. For example, the user can communicate to the application server 312 that they do not wish to deviate more than a particular distance off their existing route, or delay more than a particular amount of time from their existing route. The application server 312 can identify acceptable points of interest along the user's route based upon the desired point of interest and the acceptable route deviation information received from the user. The application server 312 can communicate this information back to the user via the wireless communication device 302. The user can either communicate back to the application server 312 which point of interest they intend to visit or the application server 312 can monitor location information provided by the wireless communication device to determine the user's location as they deviate off the route towards the desired point of interest. Alternatively, the deviation from the current route can be determined by the communication device 302. The application server 312 can then update route information from the point of interest to the destination and provide the updated route information to the user via the wireless communication device.

Figure 4:
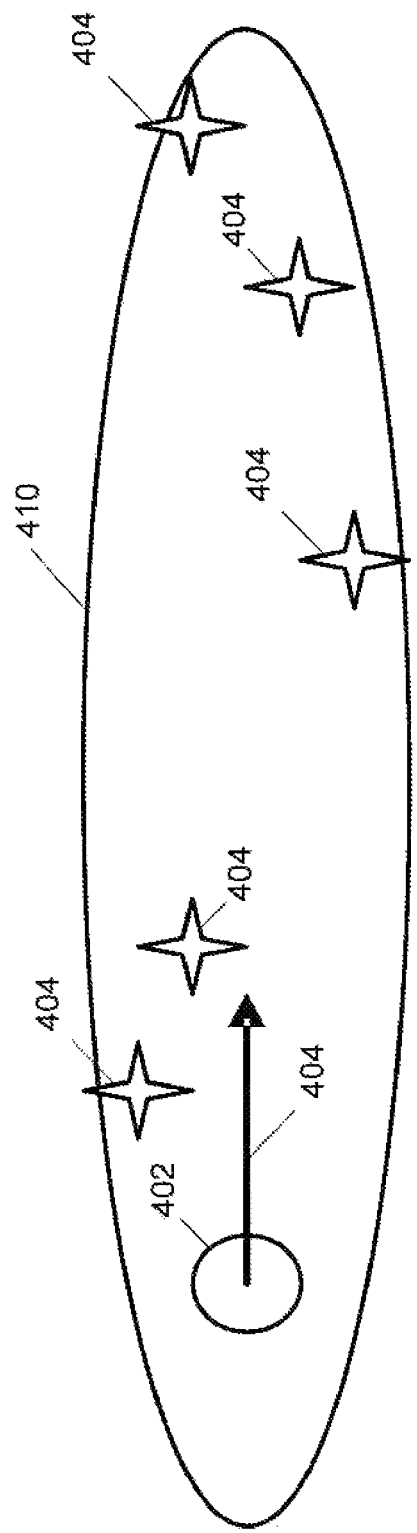
FIG. 4 is a diagram illustrating aspects of providing relevant point of interest information to a user.

FIG. 4 is a diagram illustrating aspects of providing relevant point of interest information to a user. As illustrated in FIG. 4, the user location 402 is communicated to the application server. In addition, the user's velocity 404 is communicated to the application server. In one embodiment, location information provided by the wireless communication device 302 includes information about the velocity and direction of travel of the user and a position determination entity determines the user's location and velocity and provides them to the application server. The user also communicates desired points of interest to the application server. Based upon the desired points of interest, the present location of the user 402, and the velocity and direction the user is traveling 404, the application server can locate relevant points of interest 406.

In one embodiment, the relevant region about the user 410 is based upon the user's velocity. For example, if the user is moving at a high velocity, the relevant region 410 about the user for identifying points of interest can be extended to a greater range in the direction of motion of the user. Likewise, if the user is moving at a slower velocity the relevant range 410 of interest will be nearer to the user location 402. For example, if the user is driving a car at approximately 60 miles per hour, the range 410 of relevant points of interest will extend to a great distance in front of the driver along the direction of the driver's route. Likewise, if the user is a pedestrian walking along the street their velocity is much less, so the range of relevant points of interest can be decreased to be nearer to the current location of the user 402.

In another embodiment, the search space covers the distance that will be covered due to the handset/user motion in the "search time+relevance time". The relevance time can be based on how long the point of interest will remain relevant to the user. For example, how long before the point of interest will be passed by the user as they travel along their route. In one embodiment, the relevance time can be set in terms of few minutes for a user traveling in a vehicle, for example, up to 10 to 20 minutes for pedestrian speeds. The POI data can also be prioritized in terms of a presentation list provided to the user. For example, the POI can be prioritized in terms of the relevance, such as in terms of the direction (along the direction of travel versus located in the opposite direction of travel) and ease of access of the POIs (ease of access from a road being traveled on). In other words, the points of interest along the route of travel and ahead can be considered more relevant than the points along the route and within the same distance but are behind.

Routing information can be used to determine not just the distance to the POI but also the estimated time of travel and the ease of getting to the POI. For example, for pedestrian speeds (or even stationary user) a much smaller search space can be used. In fact, a technique can be applied to filter the data based on what may be visible to the user or what is commonly treated as "walking" distance away. A filter can also be defined in terms of the accessibility via public transportation. Regarding visibility, the POIs which are a street block away may not be visible to the user at the location of search (starting position). In fact the size of the search space can be set to get the information about the POIs that are in close proximity to the user or in direct line of sight.

Mapping and Geographic Information Systems (GIS) data, including information associated with some geographic location, such as monuments, points of interest, mapping data, etc. can be used together to determine the size of a search space. For example, the search space can be based on the distance between mapping nodes (intersections) and length of the mapping arcs. In other words, the size of the street grid where the user is located can be determined, for example urban canyon versus rural area, and the search space adjusted to cover a desired area, such as an n×n street block search space. The number of street blocks and the search space in terms of distance to be searched can also be manually set by the user.

Figure 5:
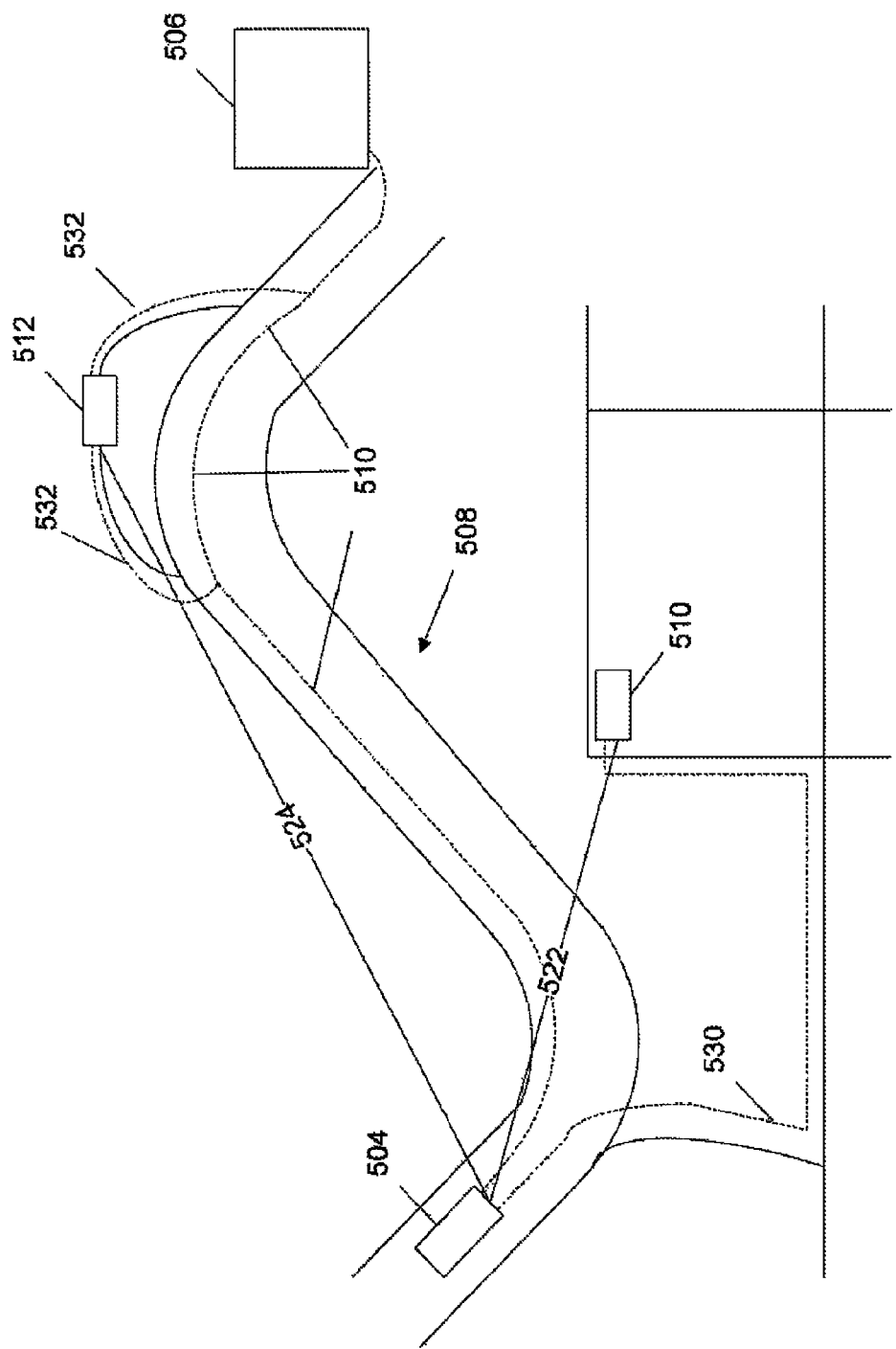
FIG. 5 is a diagram illustrating an embodiment of identifying relevant points of interest to a user.

FIG. 5 is a diagram illustrating an embodiment of identifying relevant points of interest to a user. As shown in the example of FIG. 5, a user 504 is traveling in a vehicle along a road 508. The user can communicate their current location as well as their desired destination 506 to the application server. The application server can then calculate a desired route for the user. In the example of FIG. 5, the desired route is along street 508 following the path 510 to the destination. As the driver transits along the route 510 he can communicate to the application server that he wishes to find a point of interest, such as a coffee shop. The application server can then search for coffee shops within the vicinity of the user. In addition, the application server has information about the velocity of the user 504 and the direction of travel along the route 510 of the user.

For example, knowing the location of the user and their route 510, the application server will not identify coffee shops that are behind or have been passed by the user. As shown in the example of FIG. 5, there are two relevant points of interest or coffee shops 510 and 512 in the vicinity of the user. In a conventional system the 522 and 524 distance from the user to each of the coffee shops 510 and 512 would be calculated. For example, in FIG. 5 the distance from the user's current location 504 to the first coffee shop 510 represented by line 522 is shorter than the distance from the current location of the user 504 to the second coffee shop 512 represented by the line 524. Thus, in a conventional system the user would be told that coffee shop 510 is preferred over coffee shop 512 because it is nearer to the user's current location.

However, as shown in FIG. 5, the route the user needs to take to travel from their current destination to the first coffee shop 510 represented by line 530 takes the user much farther off their desired route then the route the user travels off their current route to the second coffee shop 512 represented by line 532. In other words, as shown in example FIG. 5, although one point of interest such as coffee shop 510 may be physically closer to the user, it may not be the preferred point of interest due to difficulty of access, having to transit city streets, lack of parking, and other aspects which may make the second point of interest such as coffee shop 512 more desirable. The application server can take into account these various aspects of difficulty of reaching a particular point of interest, as well as things such as user's preferences to identify the desired points of interest and rank them according to their relevance to the user. Even if a point of interest is closer to a user's route, it may not have as high a ranking as another point of interest. Other factors, such as the types of streets, parking, and other aspects can be used to rank the relevance of various points of interest.

Figure 6:
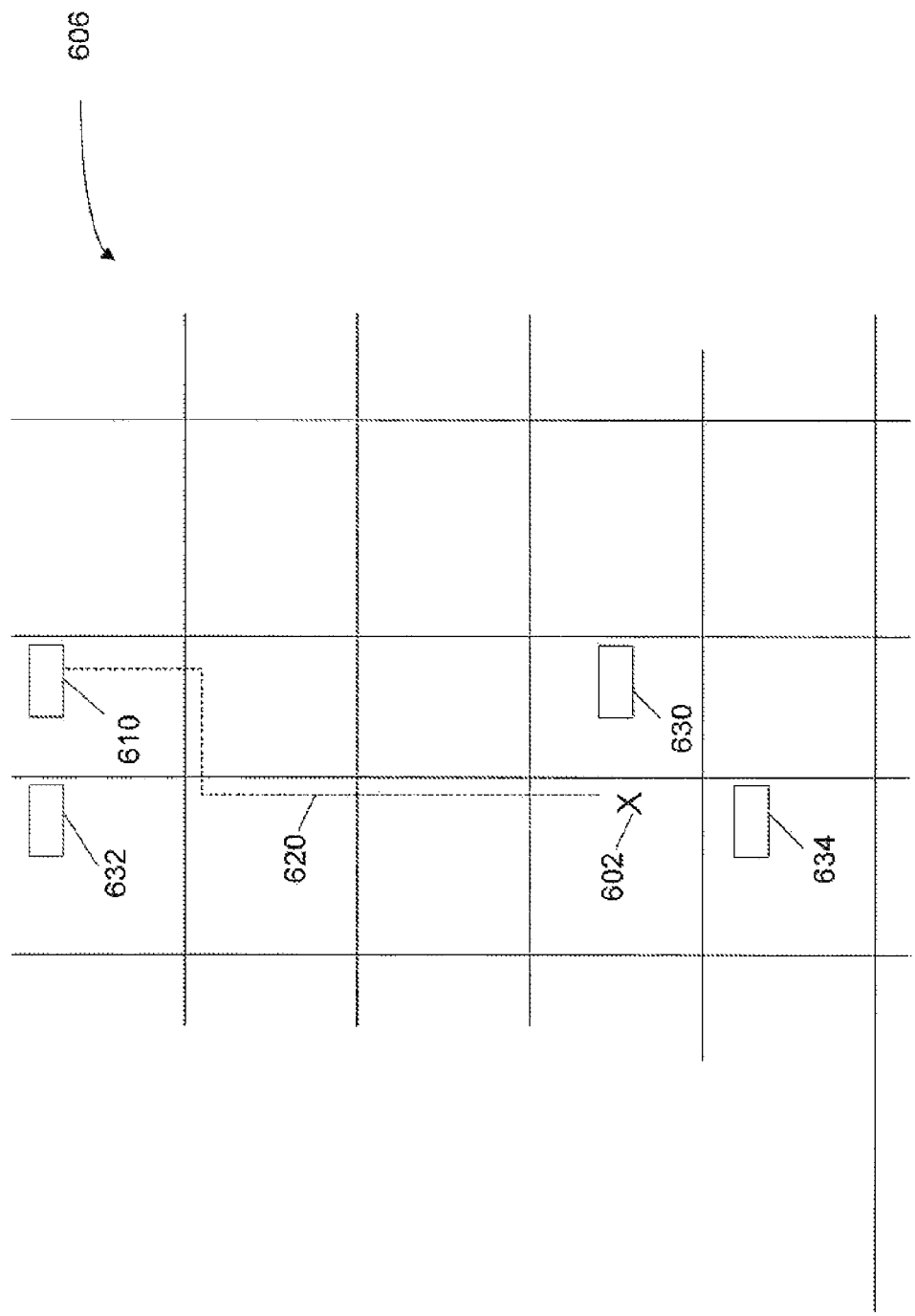
FIG. 6 is a diagram illustrating an example of a pedestrian receiving aiding information from an application server.

FIG. 6 is a diagram illustrating an example of a pedestrian receiving aiding information from a application server. As shown in FIG. 6, a user 602 is walking along city streets that are arranged in a grid 606. As the user walks along the streets they can communicate their current location and a desired destination to the application server. For example, the user 602 can desire to reach a location such as a museum 610. The application server can then calculate the desired route 620 for the user to follow to reach the user's destination 610.

As the user transits the route he may desire to find a point of interest, for example a coffee shop. The application server can then use the current location of the user 602, as well as the routing information 620 to identify relevant points of interest. In this example, because the user is a pedestrian, the user is moving much slower than in the example of FIG. 5 so that a relevant point of interest may in fact be behind or near the user. For example, a point of interest that is off-route and not considered acceptable for a vehicle application, may be a desirable point of interest for a pedestrian. For example, in a city a vehicle may be near a particular point of interest but be unable to reach the point of interest easily due to one-way streets which do not affect the travel of a pedestrian. Also, availability of parking may be relevant to the user in the vehicle but not the pedestrian.

In the example of FIG. 6 there are three coffee shops 630, 632, and 634 within the vicinity of the user 602 and the user's route 620, and the application server can rank them accordingly. As shown in FIG. 6, a first coffee shop 630 is nearest to the user but because the user is on a street adjacent to the first coffee shop 630, even though the first coffee shop 630 is the closest to the user it may be more difficult for the user to travel to that coffee shop and therefore it may not the preferred coffee shop. Likewise, a second coffee shop 632 is ahead of the user 602 and therefore closer to being along the desired route 620 of the user. However, because the second coffee shop 632 is a greater enough distance off the desired route 620 of the user it may not be the preferred point of interest. A third coffee shop 634 is behind the user 602 and generally would not be considered a relevant point of interest. However, because the user is a pedestrian and walking slowly it is not difficult for the user to turn around and walk backwards a short distance to get to the third coffee shop 634. In this embodiment, the third coffee shop 634 may be the preferred relevant point of interest because it is the least amount of deviation off the user route although it is back-tracking, or going backwards, along the user route.

Figure 7:
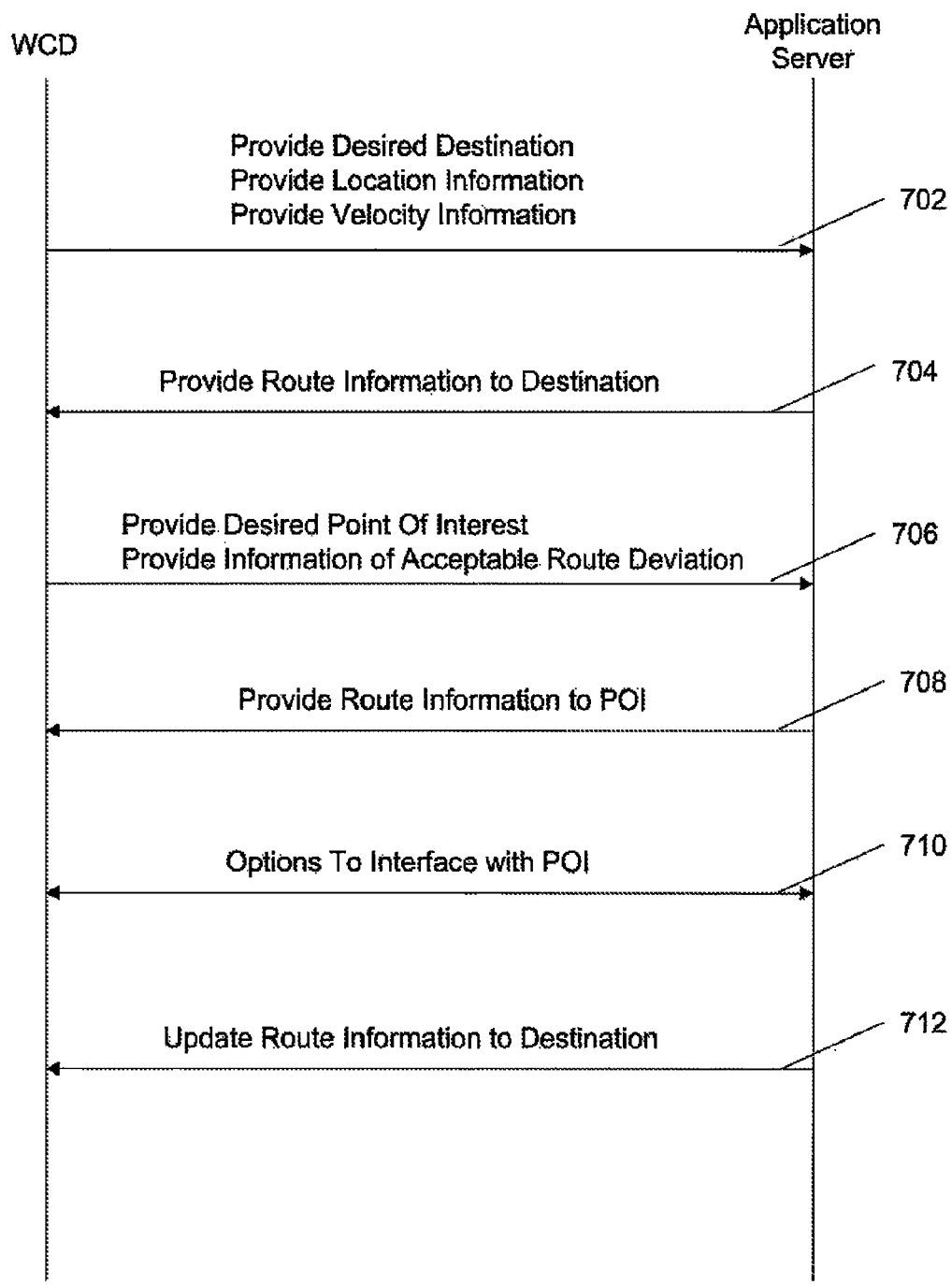
FIG. 7 is a call flow diagram illustrating an example embodiment of a wireless communication device that can be used in the systems illustrated in FIGS. 3-6.

FIG. 7 is a call flow diagram illustrating an example embodiment of a wireless communication device that can be used in the systems illustrated in FIGS. 3-6. As shown in FIG. 7, the wireless communication device provides a desired destination along with location and velocity information 702 to a wireless infrastructure. Within the wireless infrastructure there can be an application server as well as a position determining entity. The application server receives the destination along with the location and velocity information, and calculates a route for the user to reach the destination. In one embodiment, the application server receives location and velocity information from the WCD. In another embodiment, location and velocity information from the WCD is communicated to a PDE, and the PDE determines and provides the location and velocity of the WCD to the application server.

The application server provides the routing information 704 to the WCD. As the user of the WCD transits the route, they may provide desired points of interest along with information of acceptable route deviation 706 to the application server. The application server can determine relevant points of interest based upon the desired points of interest and the acceptable route deviation information, and provide routing information to the relevant points of interest 708. The user can then select the desired point of interest and proceed to that point of interest. The arrival of the user (WCD) at the intermediate point of interest can be automatically detected by the application server and the route to the original destination automatically computed and provided to the WCD.

Various options 710 can be provided to the user while traveling to the point of interest. For example, if the user is going to a point of interest, such as a coffee shop, the application server could assist in placing a telephone call from the wireless communication device to the coffee shop so that the use could call ahead and place an order. The application server could also provide information to the user of the wireless communication device concerning new estimated time of arrival that includes the deviation to the point of interest, as well as travel time to the point of interest and potential traffic conditions. The application server can update route information to the destination from the point of interest 712 and communicate the updated route information to the user of the wireless communication device. In this way, the user can re-engage their journey to the desired destination.

Figure 8:
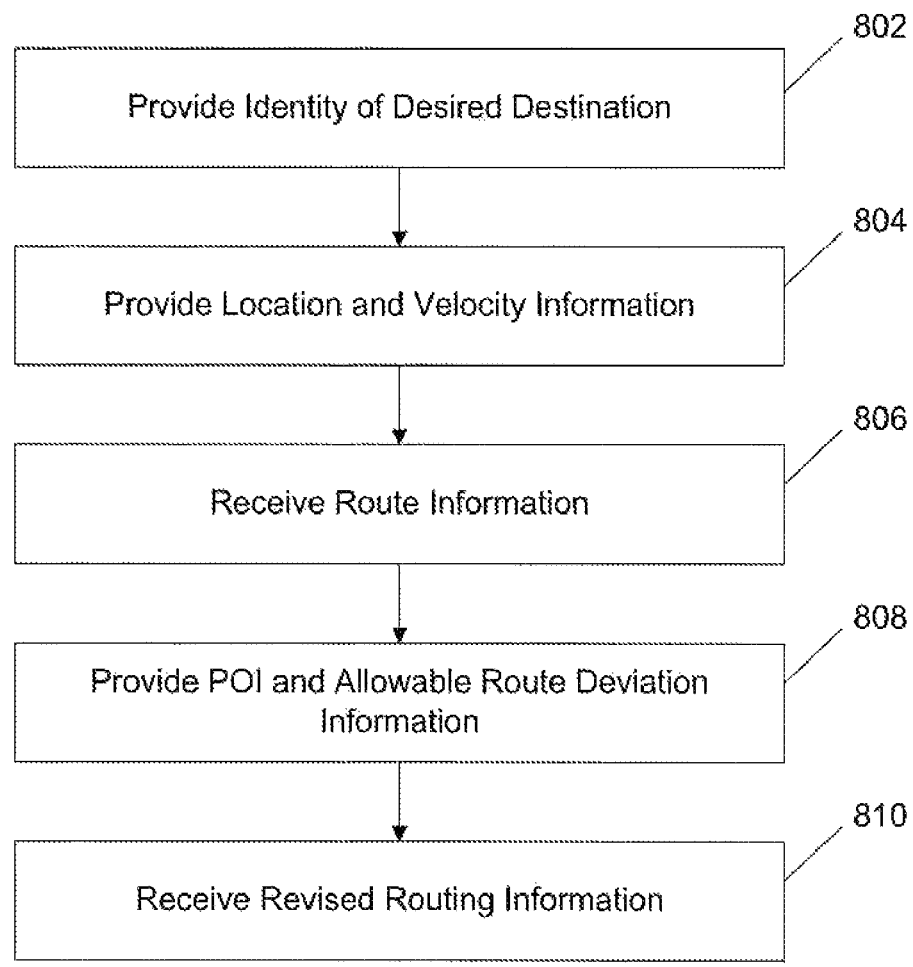
FIG. 8 is a flow diagram illustrating a technique for receiving routing information.

FIG. 8 is a flow diagram illustrating a technique for receiving routing information. Flow begins at block 802 and a user provides the identity of a desired destination. The flow continues to block 804 and information about the current location and velocity of the user is provided to a application server. Based upon the information about the current location and velocity of the user, and the desired destination, routing information is calculated and provided to the user in block 806. In block 808, as the user travels the route they can provide information about points of interest and allowable route deviation information to the application server. Based upon the desired point of interest and the allowable route deviation, revised routing information can be provided to the user in block 810.

In one embodiment, in block 808 information about the current location and velocity is updated and also provided to the application server for use in determining the revised route and relevant points of interest based upon the updated location and velocity information of the user. In an embodiment, the allowable route deviation can be an allowable distance of route that the user is willing to accept. In another embodiment, the allowable route deviation can be an allowable time delay that it is estimated that it will take the user to travel to the point of interest.

Figure 9:
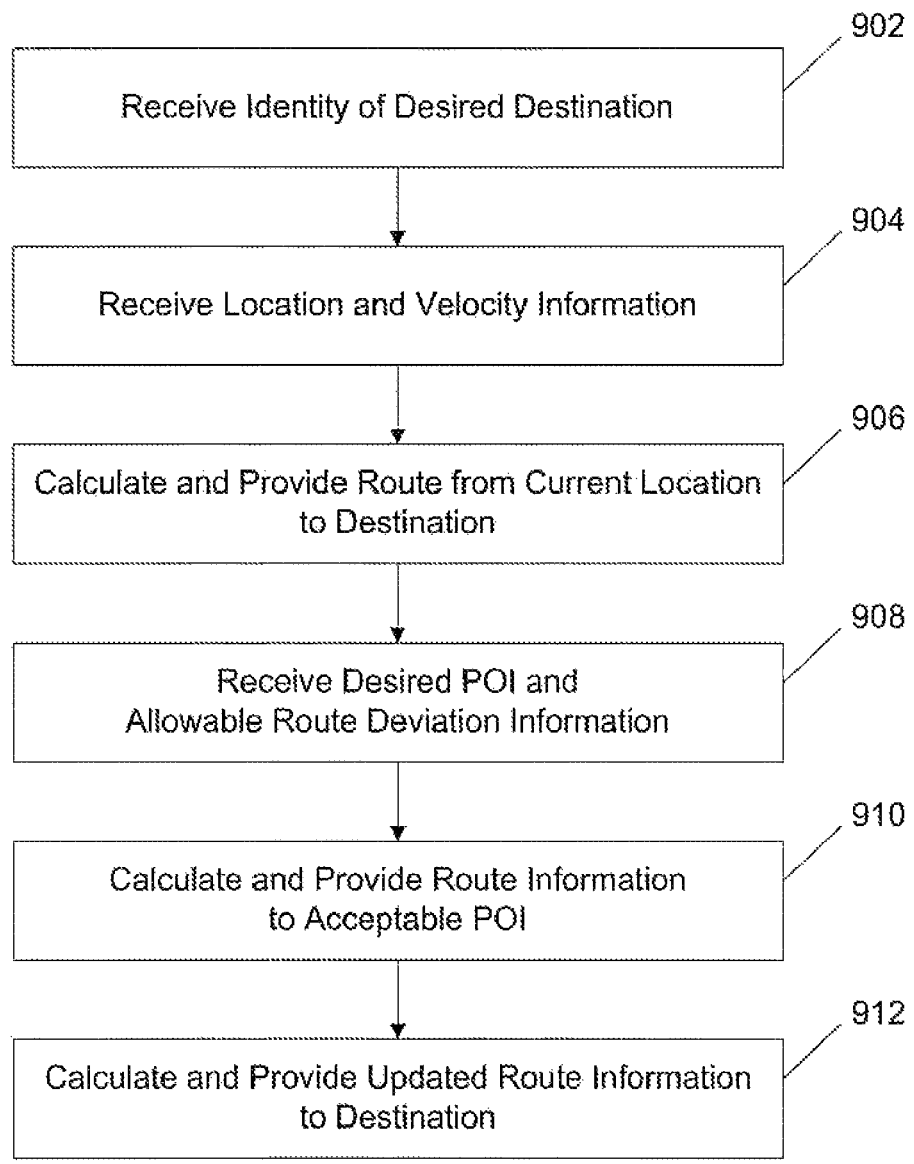
FIG. 9 is a flow chart illustrating an embodiment of calculating an updated route.

FIG. 9 is a flow chart illustrating an embodiment of calculating an updated route. Flow begins in block 902 where information about a desired destination is received. In block 904 information about a current location and velocity of a user is received. In block 906 a route from the current location of the user to the desired destination is calculated and provided to the user.

In one embodiment, as the user transits the route they can identify various points of interest that they wish to visit. For example, in block 908 information about a desired point of interest and allowable route deviation information is received from the user. Based upon the current location of the user, as well as the current velocity of the user, relevant points of interest can be identified. The various points of interest can be ranked according to their relevance to the user. For example, a point of interest can be ranked with a higher relevance if the point of interest is easier for the user to access than other points of interest, or the point of interest is nearer to the user's route, or other techniques to evaluate the relevance of a point of interest to the user.

In an embodiment, the points of interest, along with their relevance ranking, can be provided to the user and the user select a desired point of interest. In another embodiment, the most relevant point of interest is automatically selected for the user. Once a desired point of interest has been selected, routing information to the selected point of interest can be calculated and provided to the user. In block 912, updated route information to the destination is calculated based upon which of the points of interest the user visits. In addition to the routing information, the user can be provided with an updated estimated time of arrival at their destination.

Figure 10:
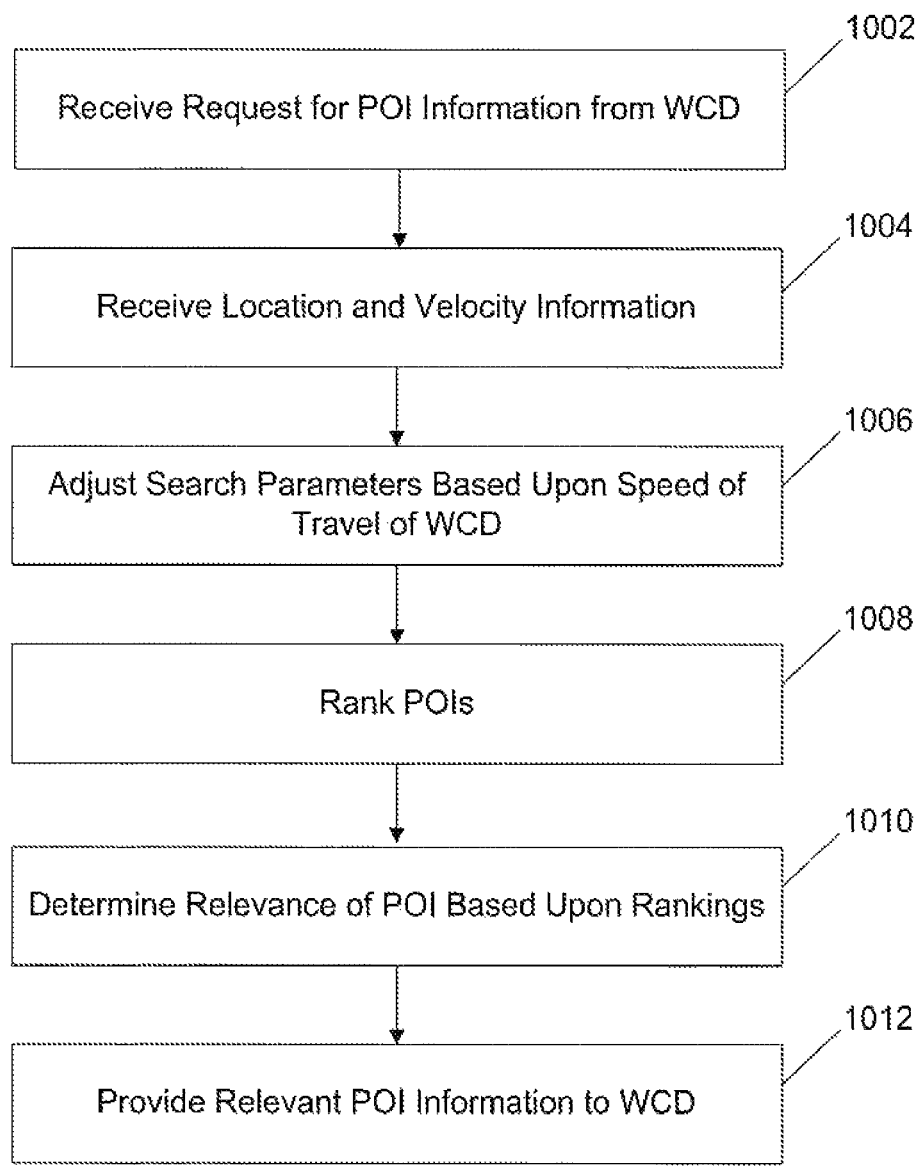
FIG. 10 is a flow diagram illustrating an embodiment of providing relevant points of interest information to a user.

FIG. 10 is a flow diagram illustrating an embodiment of providing relevant points of interest information to a user. Flow begins in block 1002 where a request for point of interest information is received from a user of a wireless communication device at an application server. In block 1004, information about the current location and velocity of the user is received at the application server. In one example, this information can be communicated to a position determination entity where the current location and velocity of the user is determined and provided back to a application server. In another embodiment, the wireless communication device can provide the user's location and velocity, or the user can manually enter the location and velocity.

In block 1006, the application server can adjust search parameters based on the locations, speed, and direction of travel of the wireless communication device. For example, if the user is in a vehicle and moving at a high speed, a different set of points of interest may be relevant versus a user that is a pedestrian and walking down a street. In block 1008, the points of interest can be ranked according to their relevance to the user. For example, the points of interest can be ranked based on their ease of access by the user, such as if a user is in a vehicle driving down the highway a point of interest that is located on an off-ramp of a highway may be preferred over a point of interest that is located several city blocks off of the highway. In another example, the relevance of the point of interest can be ranked based on the time it will take the user to travel to the point of interest. In other words, a point of interest may be physically closer to a user but because they have to transit city streets to arrive at that point of interest, it may take longer to reach the nearer point of interest than a point of interest that may be farther away that is accessed by a freeway or other high speed road. The points of interest may also be ranked based upon correlation to a desired route. For example, if a point of interest is nearby but takes the user off their desired route, such as having to back-track their route to reach the point of interest, it may be preferred to go to a point of interest that is farther away yet closer to the desired route of the user.

Flow continues to block 1010 where the relevance of the various points of interest can be determined based upon the different rankings. In block 1012, information about the relevant points of interest is communicated to the user of the wireless communication device.

While the examples described have had a user provide information about desired points of interest, the application server can also provide information to the user about points of interest that the user may be unaware of. In one embodiment, the user can provide preferences, categories, or other type of information about sites that may be of interest to the user. For example, a user may be a history buff and wish to see historic sites that may be near their route. The user can communicate their desire to see historic sites to the application server and this can be factored into the ranking of the relevant points of interest. Then, as the user transits their route there may be a historic site which would be near the user's route. The user may be unaware of the location and identity of this historic site, but the application server could identify the site and provide this information to the user so that they could deviate from the route to visit this historic site if they desire. The application server could then update and provide routing information from the historic site to the user's desired destination.

In another embodiment, information from a user's calendar can be provided to the journey server. For example, a user may have a meeting scheduled for a particular time, such as 11:00 AM. The user can provide their current location information and the location of their meeting, as well as the meeting time, to the application server and the application server can calculate and provide routing information to the user. Then, as the user transits their route they can identify a desired point of interest such as a coffee shop they would like to go to on the way to their meeting. The application server can identify coffee shops along the route and calculate the amount of time it should typically take for the user to deviate from their route to the coffee shop and then return back to their desired destination. Based on this information the application server can rank the coffee shops along the route accordingly so that the user can arrive at their desired destination on time. The application server can also update the estimated time of arrival based on the user going to the selected point of interest. In addition, the application server can monitor the users travel along the route so that if the user is going to be delayed, for example due to traffic conditions, or other reasons, the user may be notified that they may be late for their meeting and the user may chose to return to their original route. The application server can provide additional options to the user, such as providing the option of placing a call to the other attendees in the meeting to notify them that the user may be late.

Figure 11:
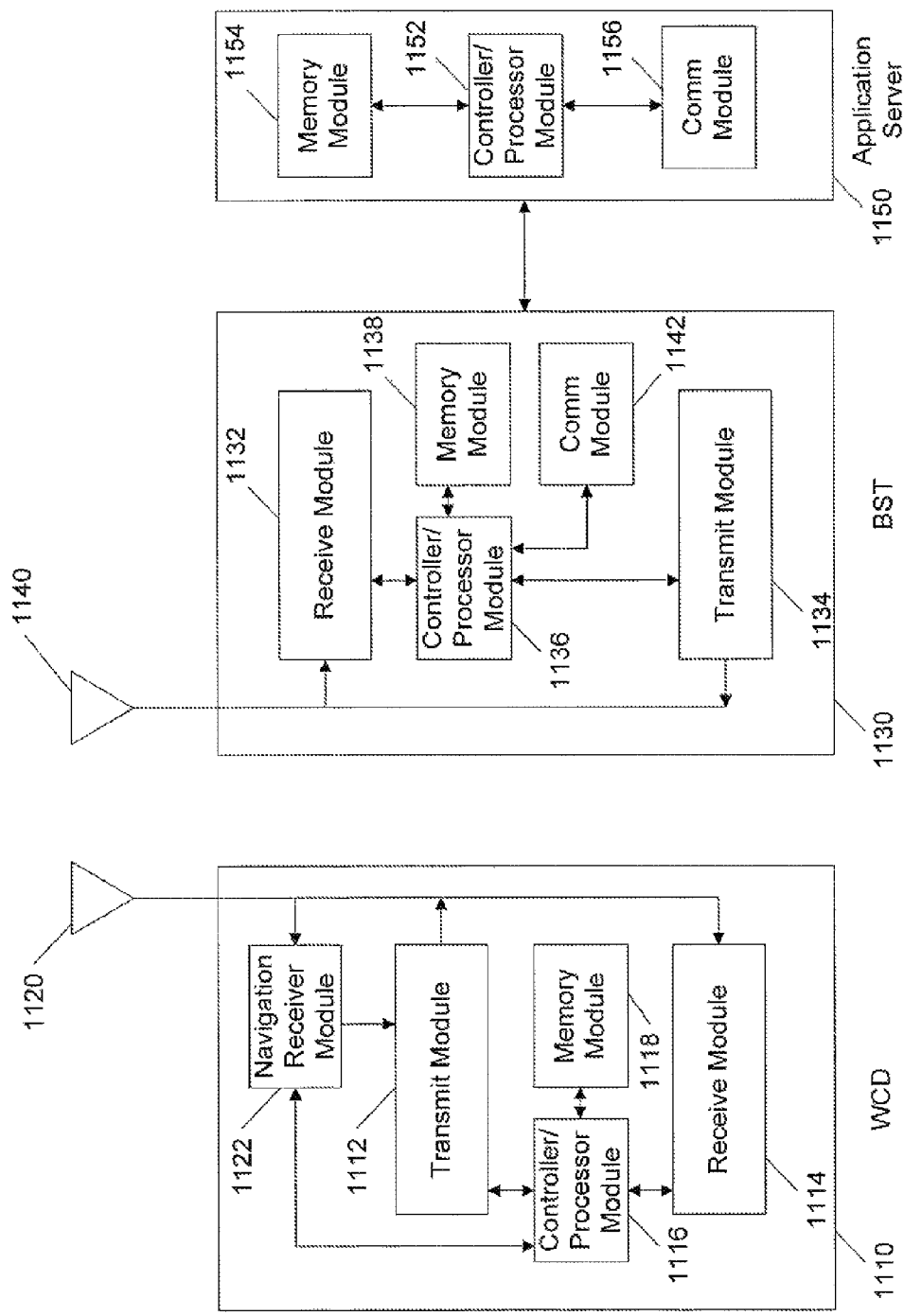
FIG. 11 is a block diagram illustrating various components of a wireless communication system.

FIG. 11 is a block diagram illustrating various components of a wireless communication system. As shown in the example of FIG. 11, the wireless communication system can include a wireless communication device (WCD) 1110, a base station transceiver (BST), or base station, 1130, and an application server 1150. In the example of FIG. 11, the WCD 1110 includes a transmit module 1112, a receive module 1114, a controller/processor module 1116, and a memory module 1118. The controller/processor module 1116 can execute program code stored in the memory module 1118 to control the operation of the transmit and receive modules 1112 and 1114. The transmit and receive modules 1112 and 1114 are in communication with an antenna 1120 to transmit and receive communication signals with the base station 1130.

In one embodiment, the WCD 1110 includes a navigational receiver module 1122. The navigational receiver module 1122 may be in communication with the antenna 1120, or a different antenna (not shown), or both, to receive navigational signals. For example, the navigational receiver module 1122 may receive navigational signals from a global satellite positioning system (SPS) such as Global Positioning System (GPS) or other satellite-based navigational system, or from a wireless infrastructure, or a combination navigational system. The navigational receiver may determine the location and velocity of the WCD 1110 and provide that information to the transmit module 1112 where it is transmitted to the application server 1150 via the base station 1130. In another embodiment, the navigational receiver 1122 receives navigational information and provides the navigational to the transmit module 1112 where it is transmitted to the application server 1150 and the application server 1150 determines the location and velocity of the WCD 1110. In another embodiment, the navigational information received at the base station 1130 is provided to a position determination entity (not shown) where the location and velocity of the WCD is determined and then provided to the application server.

The base station 1130 includes a receiver module 1132, a transmit module 1134, a controller/processor module 1136, and a memory module 1138. The controller/processor module 1136 can execute program code stored in the memory module 1338 to control the operation of the receive and transmit modules 1132 and 1134. The receive and transmit modules 1132 and 1134 are in communication with an antenna 1140 to receive and transmit communication signals with the WCD 1110. In the example illustrated in FIG. 10 only one WCD is shown. In a typical system there would be multiple WCDs in communication with the base station.

The base station 1130 also includes a communication module 1142 that communicates signals from the base station 1130 to various other modules within a wireless network infrastructure. For example the communication module 1142 may communicate signals with the application server 1150.

The application server 1150 includes a controller/processor module 1152, a memory module 1154, and a communication module 1156. The communication module 1156 can receive and transmit signals to the base station 1130 as well as other modules in the wireless network infrastructure, such as a position determination entity (not shown). For example, the communication module 1156 may receive information about a desired destination from a user of the WCD 1110. The communication module may also receive information about the location and velocity of the user of the WCD and route the information to the controller/processor 1152. The controller/processor 1152 can execute instructions, such as from program code stored in the memory module 1154, to calculate a route from the user's current location to the desired destination. The controller/processor module 1152 can communicate this route information to the user via the communication module 156, base station 1130 and WCD 1110.

The controller/processor 1152 can also receive information about desired points of interest from the user and, as described, rank the points of interest in relative relevance to the user. The controller/processor 1152 can provide this information the user via the communication module 1156, base station 1130 and WCD 1110. The controller/processor 1152 can also receive preference information form the user and identify points of interest that may be of interest to the user and provide this information to the user. Additional, the controller/processor 1152 can receive scheduling and calendar information from the user and identify points of interest and other options to the user.

In one embodiment, the application server 1150 receives the location and velocity from the WCD 1110. In another embodiment, the application server 1150 receives navigational information from the WCD and the application server 1150 determines the location and velocity of the WCD. In still another embodiment, navigational information from the WCD is provided to a position determining entity (not shown) where the location and velocity of the WCD is determined and then provided to the application server 1150.

In another embodiment, the application server can be integrated within the wireless communication device (WCD) 1110. To limit the amount of memory to be allocated to the POI information, only data relevant to the user may be stored. In one example, the relevance can be determined by one or a combination of a items, such as identifying POIs that are within a metropolitan region of interest such as the metropolitan San Francisco, a zip code, an area code, or purely distance based (such as 100 mile radius). In addition, items such as if the POI is within a metropolitan region or serviced by public transportation service, or the time of travel to the POI can be considered. Furthermore, in an embodiment, the route computation, POI selection, and ranking can also be performed in the WCD 1110.

In yet another embodiment, a hybrid implementation can be envisioned whereby some of the described functions can be implemented and executed within the WCD and other functions can be implemented and executed outside of the WCD, for example, in the application server.

When determining routes and points of interest, the controller/processor module 1152 can access information stored in the memory module 1154, such as map and Geographic Information Systems (GIS) data. In another embodiment, the controller/processor module 1152 accesses a data base (not shown) that includes map and Geographic Information Systems (GIS) data.

In general, any one or any combination of communication technologies may be used to support communication between the WCD 110, the base station 1130, and the application server 1150. For example, the base station 1130 and application server 1150 may communicate using IEEE 802.3, IEEE 802.11x, Bluetooth, UWM, ZigBee, and so on. The WCD 1110 and the base station 1130 may communicate using cdma2000, W-CDMA, GSM, OFDM, and so on.

The application techniques described herein may be implemented by various means. For example, these techniques may be implemented in hardware, firmware, software, or a combination thereof. For a hardware implementation, the processing units at a WCD, a base station, or application server, or other network entity, may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 1118, 1138, and 1154 in FIG. 11) and executed by a processor (e.g., processor 1116, 1136, and 1152 in FIG. 11). The memory may be implemented within the processor or external to the processor.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network-enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method for providing aiding information to a user in a system comprising an application server the method comprising:
   receiving at the application server a desired destination from a user;
   receiving a current location and a velocity of the user;
   calculating, via a processor, routing information relating to a route of the user to the desired destination and sending the routing information to the user;
   receiving desired point of interest information from the user at the application server;
   identifying points of interest to the user and ranking them at the application server according to their relevance to the user's current location based on the user's route beyond the current location, the user's current location, the user's velocity, and a relevance time, wherein a size of a geographic area from which the points of interest are identified is determined based at least in part on the user's velocity and wherein the relevance time is indicative of an estimated time the point of interest will remain relevant to the user; and
   wirelessly sending the identified points of interest from the application server to the user based on the relevance of the points of interest.

2. The method of claim 1, wherein the desired destination is received from the user over a wireless communication link.

3. The method of claim 1, wherein receiving the current location and velocity of the user comprises receiving navigational information about the location and velocity of the user.

4. The method of claim 1, wherein ranking the points of interest comprises ranking the points of interest based on the ease of access to the points of interest by the user, parking availability, types of streets or any combination thereof.

5. The method of claim 1, wherein ranking the points of interest comprises ranking the points of interest based on the time of travel to the point of interest by the user.

6. The method of claim 1, wherein ranking the points of interest comprises ranking the points of interest based on a correlation of a location of each of the points of interest to the route being traveled by the user.

7. The method of claim 1, further comprising receiving a preference for categories of points of interest from a user.

8. The method of claim 7, wherein information about points of interest associated with the user's preference are provided to the user.

9. The method of claim 1, further comprising using calendar information received from the user to rank relevant points of interest, the calendar information including information associated with a scheduled meeting, the method further comprising:
   determining an estimated time of arrival at a location of the scheduled meeting; and
   automatically notifying other attendees of the scheduled meeting if the estimated time of arrival at the location of the scheduled meeting is after a scheduled start time associated with the scheduled meeting.

10. A method for providing aiding information to a user in a system comprising an application server, the method comprising:
    receiving at the application server a desired destination from a user;
    receiving a current location and a velocity of the user;
    calculating, via a processor, routing information relating to a route of the user to the desired destination and sending the routing information from the application server to the user;
    receiving a preference for a category of points of interest from the user;
    identifying points of interest associated with the user's preference and ranking them at the application server according to their relevance to the user's current location based on the user's route beyond the current location, the user's current location, the user's velocity and a relevance time, wherein a size of a geographic area from which the points of interest are identified is determined based at least in part on the user's velocity and wherein the relevance time is indicative of an estimated time the point of interest will remain relevant to the user; and
    wirelessly sending identified points of interest associated with the user's preference from the application server to the user based on the relevance of the points of interest.

11. The method of claim 10, wherein ranking the points of interest comprises ranking the points of interest based on the ease of access to the points of interest by the user.

12. The method of claim 10, wherein ranking the points of interest comprises ranking the points of interest based on the time of travel to the point of interest by the user.

13. The method of claim 10, wherein ranking the points of interest comprises ranking the points of interest based on a correlation of a location of each of the points of interest to the route being traveled by the user.

14. The method of claim 10, further comprising using calendar information received from the user to rank relevant points of interest, the calendar information including information associated with a scheduled meeting, the method further comprising:
    determining an estimated time of arrival at a location of the scheduled meeting; and
    automatically notifying other attendees of the scheduled meeting if the estimated time of arrival at the location of the scheduled meeting is after a scheduled start time associated with the scheduled meeting.

15. A method for receiving aiding information for a user of a wireless communication device in a system having at least one application server, the method comprising:
    providing a desired destination of the user to the application server;
    determine via a mobile device processor and providing navigational information about the user's current location and velocity to the application server;
    receiving at the wireless communication device routing information relating to a route of the user from the user's current location to the desired destination;
    wirelessly providing desired point of interest information to the application server; and
    wirelessly receiving at the mobile device Processor, from the application server points of interest that are ranked according to their relevance to the user's current location based on the user's route beyond the current location, the user's current location, the user's velocity and a relevance time, wherein a size of a geographic area from which the points of interest are identified is based at least in part on the user's velocity and wherein the relevance time is indicative of an estimated time the point of interest will remain relevant to the user.

16. The method of claim 15, wherein providing navigational information comprises providing the current location and velocity of the user.

17. The method of claim 15, wherein the points of interest are ranked based on the ease of access to the points of interest by the user.

18. The method of claim 15, wherein the points of interest are ranked based on the time of travel to the points of interest by the user.

19. The method of claim 15, wherein the points of interest are ranked based on a correlation of a location of each of the points of interest to the route being traveled by the user.

20. The method of claim 15, further comprising providing a preference for categories of points of interest from the user to the application server.

21. The method of claim 15, further comprising providing calendar information for the user to the application server where it is used to rank relevant points of interest, the calendar information including information associated with a scheduled meeting, the method further comprising:
   receiving from the application server an indication that an estimated time of arrival at a location of the meeting is after a scheduled start time associated with the scheduled meeting; and
   receiving a query from the application server asking whether other attendees of the scheduled meeting should be notified of the estimated time of arrival.

22. A method for receiving aiding information for a user of a wireless communication device in a system having at least one application server, the method comprising:
   providing a desired destination from the user to the application server;
   determine via a mobile device processor and providing navigational information about a current location and a velocity of the user to the application server;
   receiving at the wireless communication device routing information relating to a route of the user to the desired destination;
   wirelessly providing a user preference for a category of points of interest to the application server; and
   wirelessly receiving, at the mobile device processor, from the application server point of interest information associated with the user's preference and current location based on the user's route beyond the current location, the user's current location, the user's velocity and a relevance time, wherein a size of a geographic area from which the points of interest are identified is based at least in part on the user's velocity and wherein the relevance time is indicative of an estimated time the point of interest will remain relevant to the user.

23. The method of claim 22, further comprising using calendar information from the user to determine a relevance of the points of interest, the calendar information including information associated with a scheduled meeting, the method further comprising:
   receiving from the application server an indication that an estimated time of arrival at a location of the meeting is after a scheduled start time associated with the scheduled meeting; and
   receiving a query from the application server asking whether other attendees of the scheduled meeting should be notified of the estimated time of arrival.

24. A device, comprising:
   a wireless receiver module that receives a desired destination, a current location and velocity, and a desired point of interest from a user;
   a controller module that calculates routing information relating to a route of the user from the current location to the desired destination, and the controller module identifies points of interest along the route of the user and ranks the points of interest according to a relevance of the points of interest to the user's current location based on the user's route beyond the current location, the user's current location the user's velocity, and a relevance time,
   wherein a size of a geographic area from which the points of interest are identified is determined based at least in part on the user's velocity and wherein the relevance time is indicative of an estimated time the point of interest will remain relevant to the user; and
   a wireless transmit module that receives the routing information and the ranked points of interest from the controller and transmits the routing information and the ranked points of interest to the user.

25. The device of claim 24, further comprising a memory module that includes map and geographic data.

26. A device, comprising:
   a wireless receiver module that receives a desired destination, a current location and velocity, and a preference for points of interest from a user;
   a controller module that calculates routing information relating to a route of the user from the current location to the desired destination, and the controller module identifies points of interest along the route of the user based on the user's preference for points of interest, and ranks the points of interest according to a relevance of the points of interest to the user's current location based on the user's route beyond the current location, the user's current location, the user's velocity and a relevance time, wherein a size of a geographic area from which the points of interest are identified is based at least in part on the user's velocity and wherein the relevance time is indicative of an estimated time the point of interest will remain relevant to the user; and
   a wireless transmit module that receives the routing information and the ranked points of interest from the controller and transmits the routing information and the ranked points of interest to the user.

27. The device of claim 26, further comprising a memory module that includes map and geographic data.

28. A computer program product, comprising:
   a non-transitory computer-readable storage medium having a computer program stored thereon, wherein the computer program comprises:
      code for causing a computer to receive a desired destination from a user;
      code for causing a computer to receive a current location and a velocity of the user;
      code for causing a computer to calculate routing information relating to a route of the user to the desired destination and provide the routing information to the user;
      code for causing a computer to wirelessly receive desired point of interest information from the user;
      code for causing a computer to identify points of interest and to rank the identified points of interest according to their relevance to the user's current location based on the user's route beyond the current location, the user's current location the user's velocity and a relevance time, wherein a size of a geographic area from which the points of interest are identified is determined based at least in part on the user's velocity and wherein the relevance time is indicative of an estimated time the point of interest will remain relevant to the user; and
      code for causing a computer to wirelessly provide points of interest to the user based on the relevance of the points of interest.

29. A computer program product, comprising:
a non-transitory computer-readable storage medium having a computer program stored thereon, wherein the computer program comprises:
- code for causing a computer to provide a desired destination of the user to an application;
- code for causing a computer to provide navigational information about the user's current location and velocity to the application;
- code for causing a computer to wirelessly receive routing information relating to a route of the user from the user's current location to the desired destination;
- code for causing a computer to provide desired point of interest information to the application; and
- code for causing a computer to wirelessly receive identified points of interest that are ranked according to their relevance to the user's current location based on the user's route beyond the current location, the user's current location, the user's velocity, and a relevance time, wherein a size of a geographic area from which the points of interest are identified is based at least in part on the user's velocity and wherein the relevance time is indicative of an estimated time the point of interest will remain relevant to the user.

\* \* \* \* \*